United States Patent
Ling

(10) Patent No.: US 11,258,185 B2
(45) Date of Patent: Feb. 22, 2022

(54) DISTORTION REDIRECTION IN A PHASED ARRAY

(71) Applicant: Maxlinear, Inc., Carlsbad, CA (US)

(72) Inventor: Curtis Ling, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 149 days.

(21) Appl. No.: 16/372,572

(22) Filed: Apr. 2, 2019

(65) Prior Publication Data

US 2019/0305438 A1 Oct. 3, 2019

Related U.S. Application Data

(60) Provisional application No. 62/651,332, filed on Apr. 2, 2018.

(51) Int. Cl.
*H01Q 21/06* (2006.01)
*H04B 1/04* (2006.01)
*H01Q 3/26* (2006.01)

(52) U.S. Cl.
CPC ............ *H01Q 21/061* (2013.01); *H01Q 3/26* (2013.01); *H04B 1/04* (2013.01); *H04B 1/0475* (2013.01); *H04B 2001/0425* (2013.01)

(58) Field of Classification Search
CPC .......... H01Q 3/24; H01Q 21/061; H01Q 3/26; H04B 2001/0425; H04B 1/0475; H04B 1/04; G01S 3/32; G01S 3/325
See application file for complete search history.

(56) References Cited

U.S. PATENT DOCUMENTS

| | | | | |
|---|---|---|---|---|
| 4,214,244 A | * | 7/1980 | McKay | G01S 3/325 342/17 |
| 6,792,250 B1 | * | 9/2004 | Zarubin | H04B 1/0475 327/105 |
| 9,768,852 B2 | | 9/2017 | Ling et al. | |
| 9,825,694 B2 | | 11/2017 | Gallagher et al. | |
| 10,103,822 B2 | | 10/2018 | Ling et al. | |
| 2017/0054491 A1 | * | 2/2017 | Gallagher | H01H 13/14 |
| 2019/0157756 A1 | | 5/2019 | Ling | |
| 2019/0238204 A1 | * | 8/2019 | Kim | H04L 27/367 |

OTHER PUBLICATIONS

U.S. Appl. No. 16/372,569, filed Apr. 2, 2019.
U.S. Appl. No. 16/372,577, filed Apr. 2, 2019.

* cited by examiner

*Primary Examiner* — Ricardo I Magallanes
(74) *Attorney, Agent, or Firm* — Maschoff Brennan

(57) ABSTRACT

A system comprises a plurality of antenna elements arranged in a two-dimensional array, and a plurality of transmitter circuits communicatively coupled to the antenna elements, wherein the antenna elements and transmitter circuits are configured such that desired components of signals output by the plurality of transmitter circuits and radiated via the antenna elements coherently combine in a desired direction. Each of the transmitter circuits is operable to generate a corresponding second signal for transmission via a respective one of the antenna elements by shifting a phase of undesired components in the signal relative to a phase of desired components in the signal.

20 Claims, 13 Drawing Sheets

DISTORTION REDIRECTION IN A PHASED ARRAY

PRIORITY CLAIM

This application also claims priority to U.S. provisional application 62/651,332 titled Distortion Redirection In A Phased Array With Integrated Circulator and filed on Apr. 2, 2018, which is hereby incorporated herein by reference in its entirety.

BACKGROUND

Limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for distortion redirection in a phased array, substantially as shown in and/or described in connection with at least one of the figures, as set forth more completely in the claims.

Advantages, aspects and novel features of the present disclosure, as well as details of an illustrated embodiment thereof, will be more fully understood from the following description and drawings.

DETAILED DESCRIPTION OF THE INVENTION

Figure 1A:
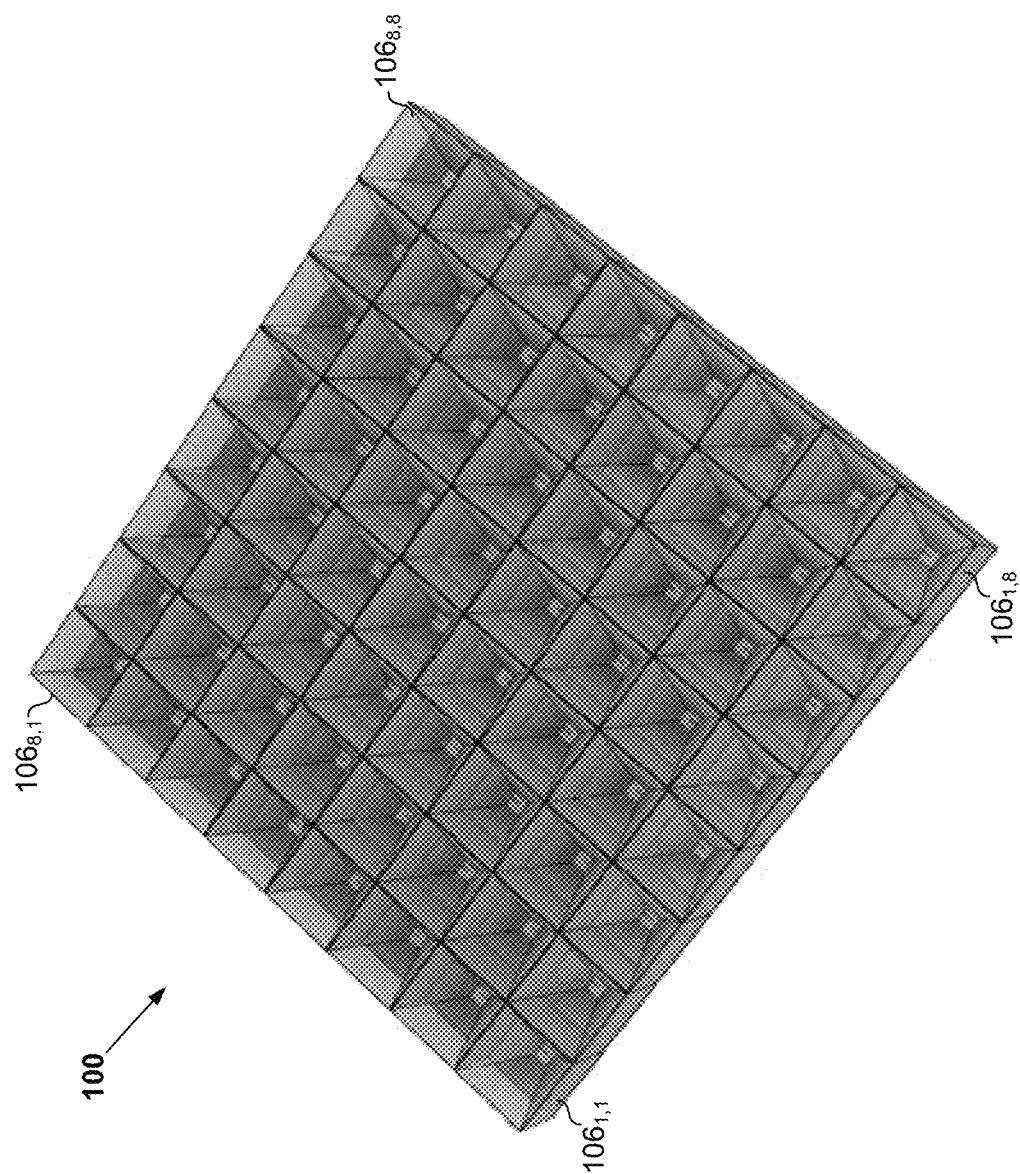
FIGS. 1A-1C illustrate an example phased array system.
Figure 1B:
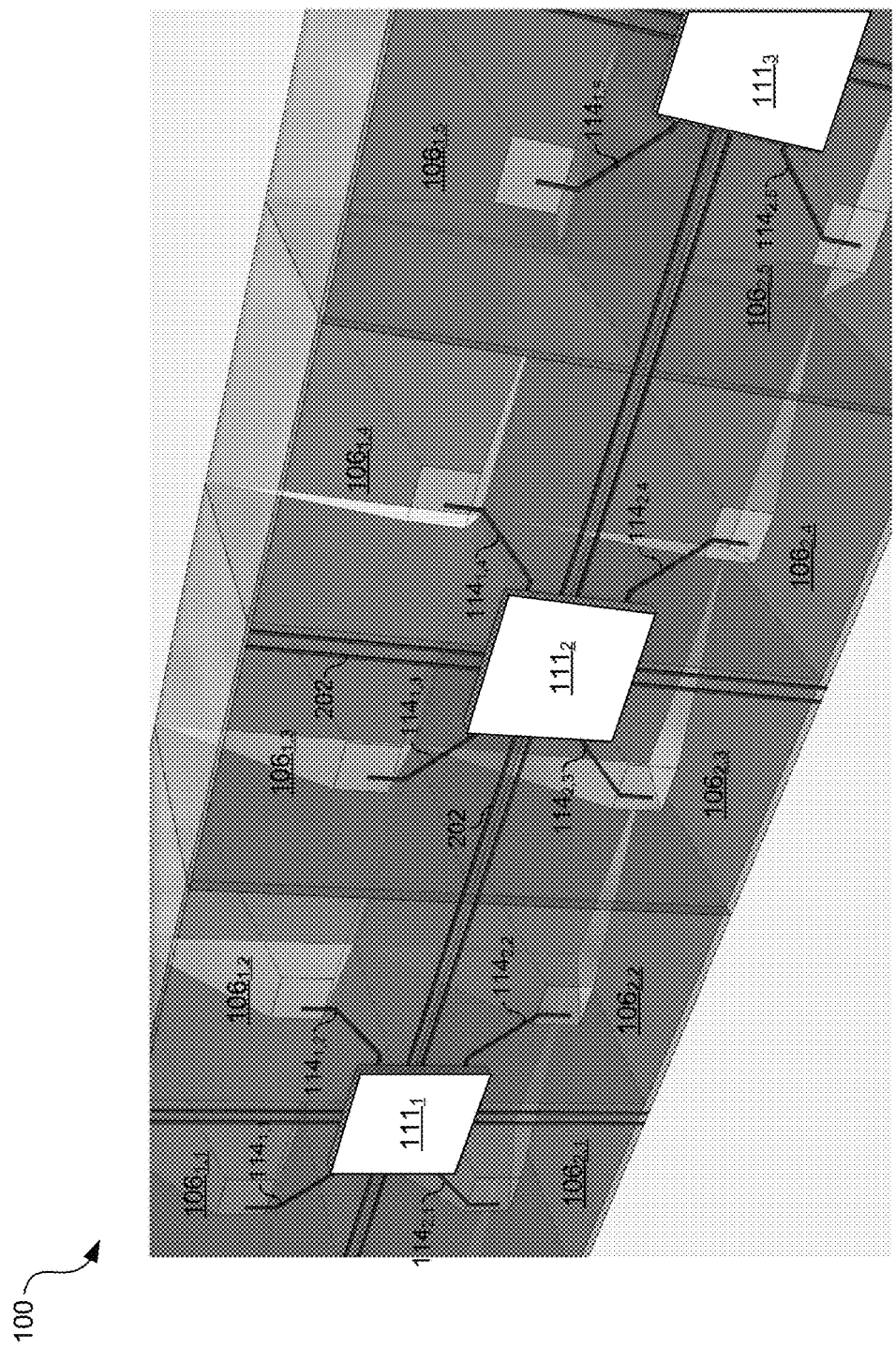
Figure 1C:
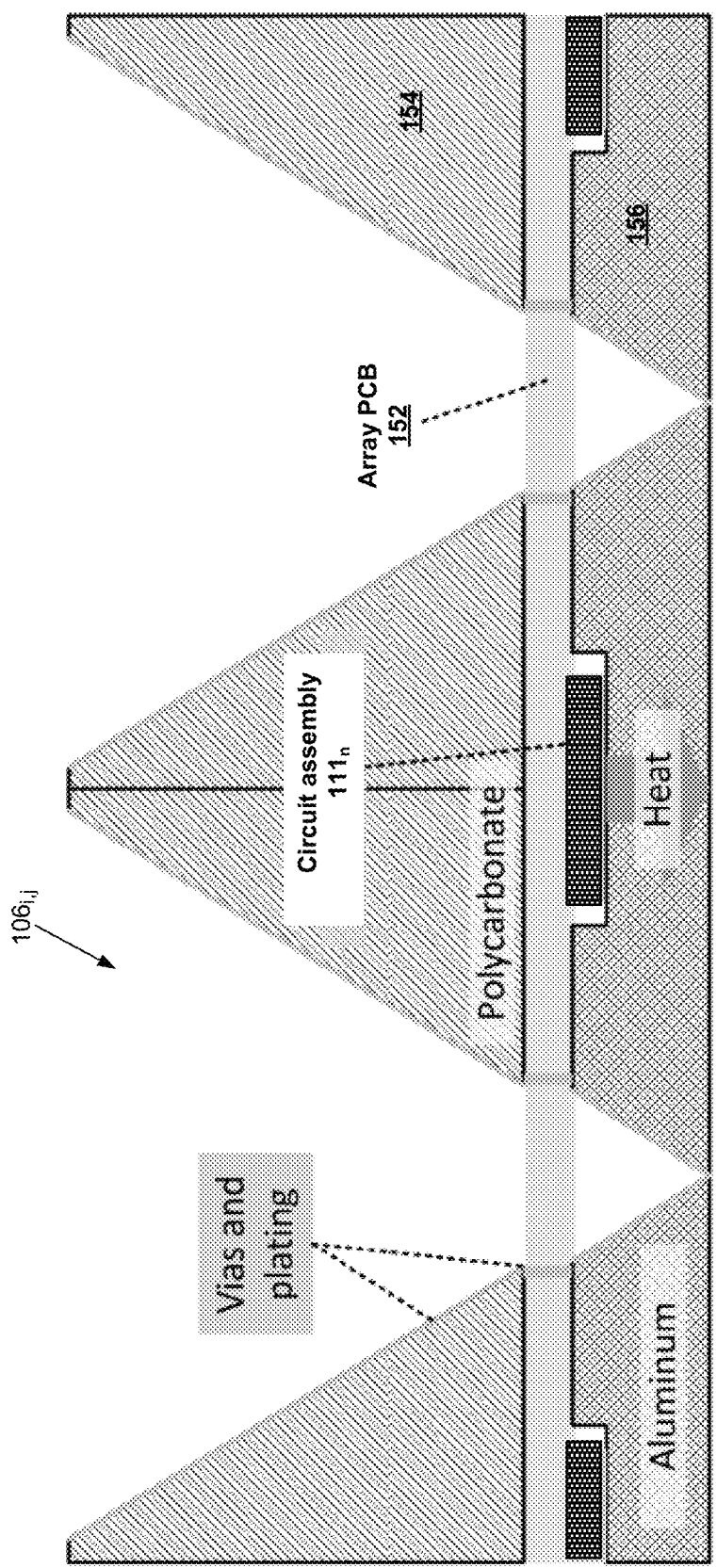

FIGS. 1A-1C illustrate an example phased array system 100. FIG. 1A shows a front view and FIG. 1B shows a rear view.

The phased array system 100 comprises a plurality of antenna elements arranged in a 2-dimensional array. Each antenna element is called out as 106$i,j$, where i is an integer corresponding to the antenna element's row index in the array (0<=i<=I) and j is an integer corresponding to the antenna element's column index in the array (0<=j<=J). In the example shown there are 8 antenna elements in each row and 8 antenna elements in each column, (i.e., I=8 and J=8), but in practice any number of antenna elements may be used. The transmission and reception of signals by the system 100 may take advantage of beamforming and may be particularly configured for addressing possible issues (interference, etc.) and/or to provide added features, as described below.

The example phased array system 100 of FIGS. 1A-1C comprises an array of antenna element elements 106, and one or more circuits assemblies 111 operable to transmit and/or receive signals via the array of antenna elements 106. The circuits 111 are operable to perform various signal processing related functions, as well as (optionally) other functions (e.g., control, storage, etc.) in support of the transmission and reception of signals via the antenna elements 106. In the example implementation shown, the system 100 comprises N (an integer) circuit assemblies 111$n$ (1<=n<=N), each of which is operable to transmit and/or receive via a respective M (an integer) of the antenna elements 106 (N=16 and M=4 in the example shown).

Antenna elements 106, of which two elements are shown in the cross-section slice depicted in FIG. 1C, may be formed using a carved horn structure 154, which may comprise polycarbonate (or plastic or other suitable material) with a conductive plating (e.g., aluminum) covering the surfaces to form horn-shaped antenna elements 106. The antenna elements 106 may be mounted to a rigid base structure 156 (e.g., made of aluminum). In between the base structure 156 and the horn structure 154 may be one or more printed circuit board (PCB) 152 that provides RF traces that interconnect the circuit assemblies 111 and the antenna elements 106.

Phased array systems, such as the phased array system 100, offer various advantages and/or improvements over conventional antenna systems, such as dish-based designs. For example, their light weight, small form factor, and ability to electronically steer the signal through beamforming p may give phased array systems an advantage over dish-based designs in some contexts. The lack of a bulky parabolic reflector and related components (e.g., the frequency duplexer, large power amplifier ("PA"), etc.) allows for installation at a wider range of sites, with lower cost of installation and operation (e.g., due to the ability to automatically and electronically align and re-align the antenna). Accordingly, phased array systems may be installed in a more flexible manner compared to dish-based systems, allowing installation options not possible or practical with traditional designs—e.g., mounting to sides of buildings, etc.

Phased array systems may have lower costs (e.g., fewer, smaller, and less expensive circuits, etc.). Also, the use of software-defined multiband array operation adds more flexibility. For example, the elimination of certain components (e.g., duplexers) allows phased array systems to operate across a wide frequency range, achieve greater link reach for the same antenna size (due to, e.g., greater transmitter power, interference suppression, etc.), and reduce costs (e.g., through lower operating and maintenance expenditures, greater frequency reuse, lower weight, etc.). Further, phased array systems may have superior thermal dissipation characteristics. In addition, the same core technology may be used for different interfaces and/or frequencies bands, allowing for common software and hardware development.

However, some issues may arise with phased arrays and use thereof. For example, one of the issues with phased arrays is the potential distortion caused by certain components, such as power amplifiers. In this regard, power amplifiers typically may be the last circuit and/or processing step in a transmit signal path, and characteristics of the power amplifiers may have important effects on the transmission of signals and quality thereof. For example, one such effect is the distortion that may be introduced by the power amplifiers during transmission of signals, such as because of certain characteristics (e.g., nonlinearity) in the power amplifiers. This may be particularly troublesome because power amplifier distortion in conventional phased arrays is co-directional with the desired signal. Thus, addressing power amplifier distortion may be desirable for improving performance in phased array systems.

Accordingly, in various implementations in accordance with the present disclosure, phased array systems may be configured to incorporate measures for mitigating power amplifier distortion. For example, systems in accordance with this disclosure may be configured to direct power amplifier distortion in a different direction from desired signal. For example, distortion components for all antenna elements may be directed in one direction different than the desired signals, or in different directions. Such redirecting of distortion may result in substantial improvement to spectral purity at the desired receiver.

In various implementations, distortion may be directed in a controlled fashion and may be pointed at an innocuous direction and/or spread out spatially over multiple directions, as desired. The redirection and/or spatial distribution of distortion may be adaptively controlled, such as to conform to required radiation pattern envelopes (e.g., such as mandated by the Federal Communications Commission and/or other regulatory bodies). In an example implementation, a distortion vector is variably rotated, with the rotation being continually changed based on some criteria, such as based on the antenna elements (e.g., the rotation change being implemented as a function of antenna index i which is used to uniquely identify each antenna element in the phased array). For example, rotation may be changed by introduction of an additional distortion vector, or other techniques. This is described in more detail below.

Figure 2:
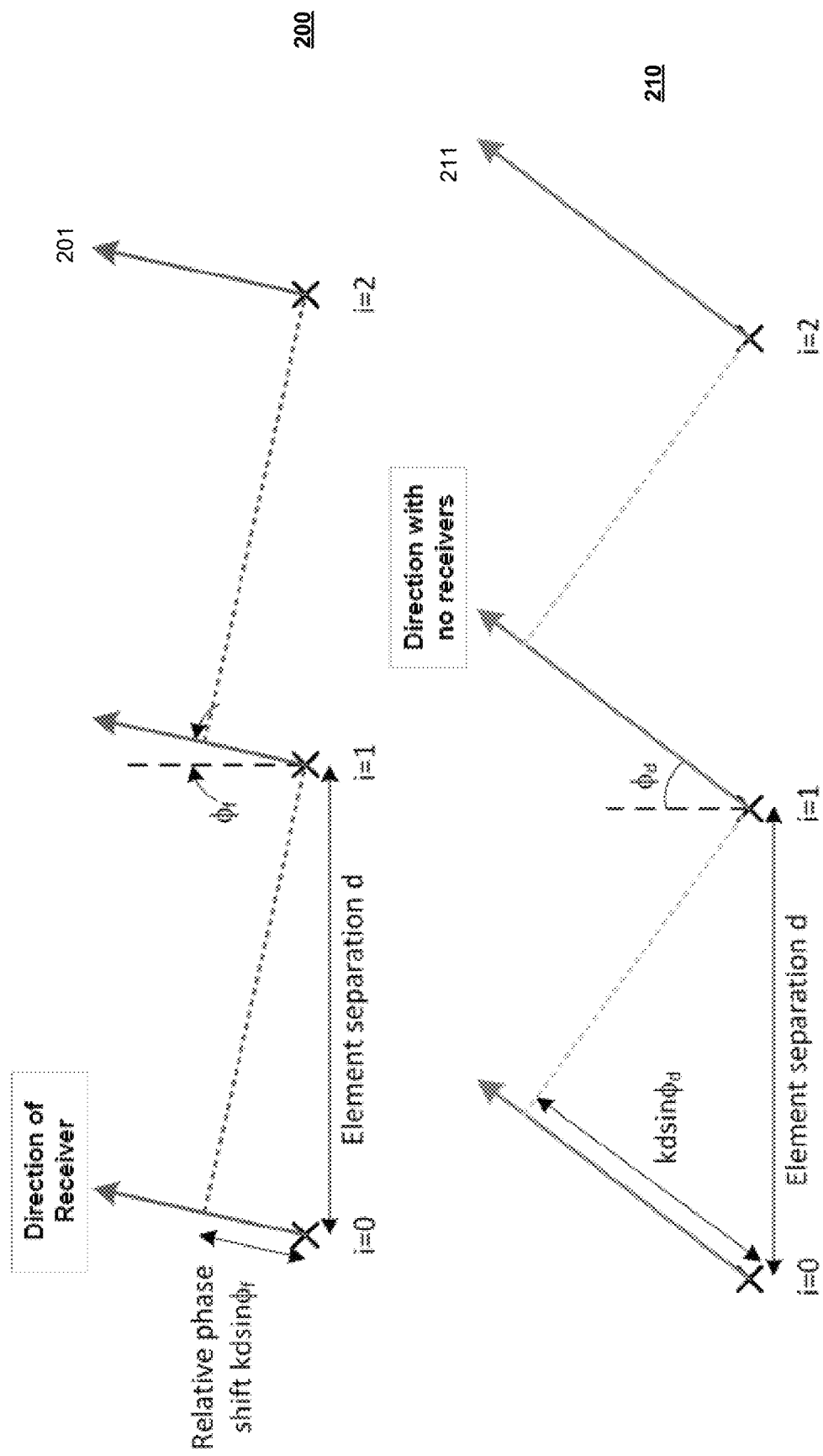
FIG. 2 illustrates effects of distortion redirection on transmissions of different elements of a phased array.

FIG. 2 illustrates effects of distortion redirection on transmissions of different elements of a phased array. Shown in FIG. 2 are charts 200 and 210, corresponding respectively to (1) the desired signals emitted by antenna elements in a phased array, and (2) distortions (e.g., introduced by power amplifiers) emitted by these antenna elements.

Shown in chart 200 are desired (fundamental) signals $201_i$ of three antenna elements (each identified by its unique antenna index: i=0, i=1, and i=2). These antenna elements are separated by a constant element separation d (distance between each adjacent elements). The fundamental signals $201_i$ may be configured to project—that is, have their power add coherently—in a particular direction (e.g., $\Phi_f$). This may be done by introducing a phase shift (e.g., kd sin $\Phi_f$) at each antenna element relative to the previous antenna element.

Shown in chart 210 are distortion vectors $211_i$ corresponding to the same three antenna elements referenced in chart 200—that is, the antenna elements identified by antenna indexes: i=0, i=1, and i=2. These distortion signals $211_i$ may project in particular direction (e.g., $\Phi_d$), resulting from a corresponding phase shift (e.g., kd sin $\Phi_d$) at each antenna element.

In an example implementation, the distortion may be spread in different directions by applying a phase shift to change the angle at which distortion is directed. For example, the distortions may be projected in different directions by applying adjustment in an adaptive manner to rotate the distortion, such as based on the corresponding antenna index. This is explained in more detail with respect to FIG. 3.

Figure 3:
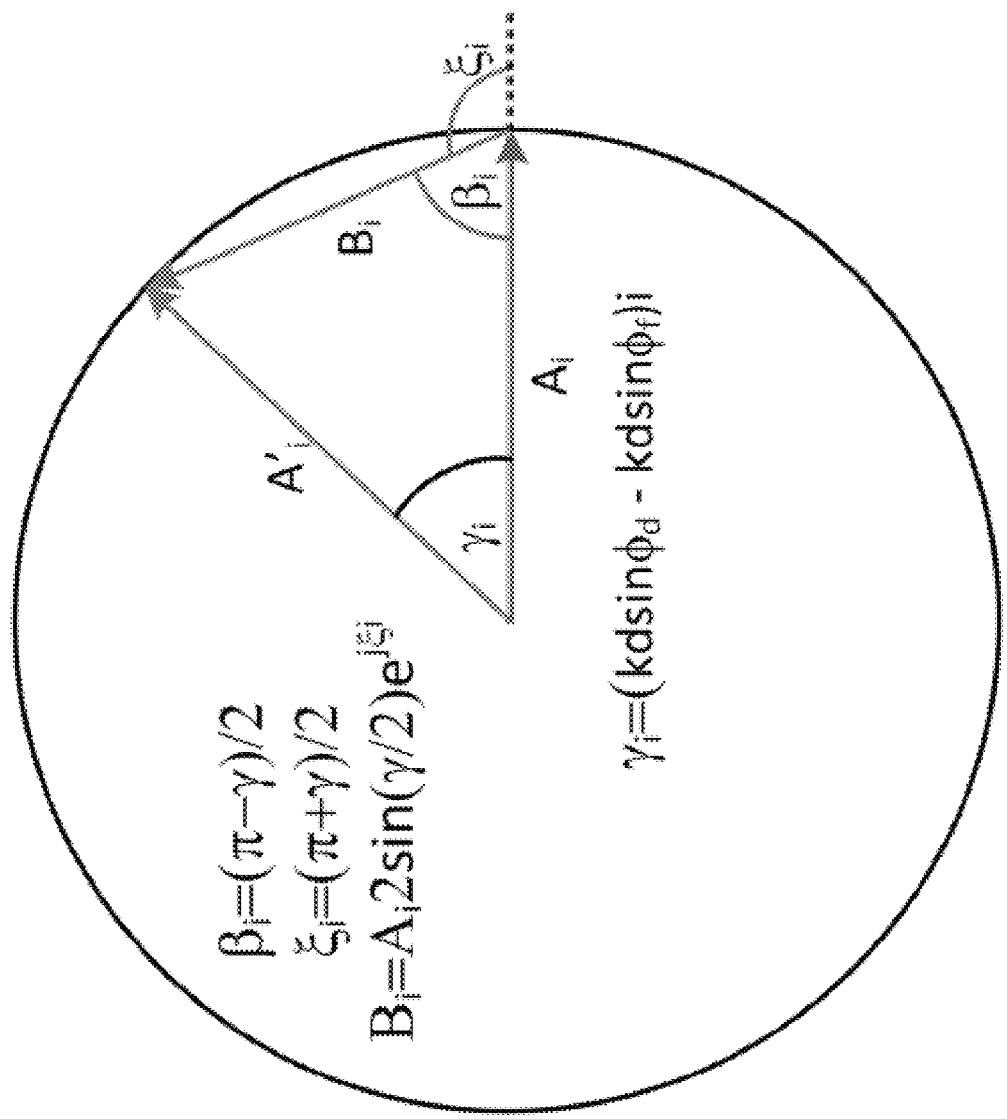
FIG. 3 illustrates an example approach for implementing distortion redirection in a phased array.

FIG. 3 illustrates and example approach for implementing distortion redirection in a phased array. As shown in FIG. 3, distortion vectors are rotated to redirect and/or spread distortion emitted by the array 100. In an example implementation, the distortion vectors may be rotated as a function of antenna index. That is, the angle at which a particular antenna element's distortion is directed may depend on that antenna element's physical location within the array 100.

For example, assuming vector $A_i$ shown in FIG. 3 represents the distortion vector (i being the antenna index of the antenna element, as described with respect to FIG. 2), vector $A_i'$ represents the redirected distortion. The redirecting may be achieved by computing and applying an additional angular rotation for antenna element i, resulting in the vector $A_i'$ rotating at a different rate than the vector $A_i$.

In an example implementation, this distortion redirection may be done by computing and applying an adjustment vector $B_i$ to rotate distortion (e.g., by $\gamma_i$) at a rate that is a function of the antenna index and that may be different than the rate at which the desired/fundamental signal is rotated. In this regard, the vector $B_i$ may be computed such that the distortion rotation angle $\gamma_i$ is a function of the value of antenna index i—e.g., by adjusting $\gamma_i$ based on the antenna index i. For example, with reference to the scenario described in FIG. 2, the rotation angle $\gamma_i$ and the corresponding adjustment vector $B_i$ (which must be applied to achieve that rotation angle) may be computed as:

$$\gamma_i = (kd \sin \Phi_d - kd \sin \Phi_f)*i \quad \text{(Eq. 1)}$$

$$B_i = A_i * 2 \sin(\gamma_i/2) e^{j\xi i} \quad \text{(Eq. 2)}$$

In an example implementation, the distortion may be rotated in a phase-coherent manner such that the distortion elements from the multiple antennas coherently combine in a desired direction (e.g., toward the sky, away from any receivers). In an example implementation, the distortion may be rotated randomly or pseudorandomly so that the distortion is spread out spatial and has relatively low power in any particular direction.

Accordingly, use of distortion redirection in accordance with various implementations of the present disclosure has many advantages and provides many improvement over existing solutions. For example, distortion redirection in accordance with the present disclosure does not require precise modeling or tracking of the power amplifiers. In this regard, the rotation technique used in conjunction with the present disclosure is robust (e.g., +/−30% or more) with respect to model inaccuracies and drift. Additionally, other distortion mitigation measures (e.g., digital pre-distortion (DPD) techniques) typically require a feedback path. The rotation technique of the present disclosure does not require a feedback path to track the power amplifiers. The distortion redirection also allows for spreading distortion spatially to further reduce its potential impact. For example, a redirection angle for an antenna element i can be changed per symbol. Also, the angle(s) to which the distortion is redirected can be chosen to be innocuous—e.g., pointed where no other users reside (at the sky, for example). The distortion redirection may be done such that the distortion is directed in a manner that enhances security (e.g., toward sidelobes such that distortion corrupts the fundamental signal present in the sidelobes). Improvements may be obtained from use of distortion redirection even under particularly adverse conditions (e.g., hard clipping) where other distortion related techniques (e.g., DPD) may not be effective. The distortion redirection may be combined with open-loop or feedback-based DPD for further performance gains.

Figure 4A:
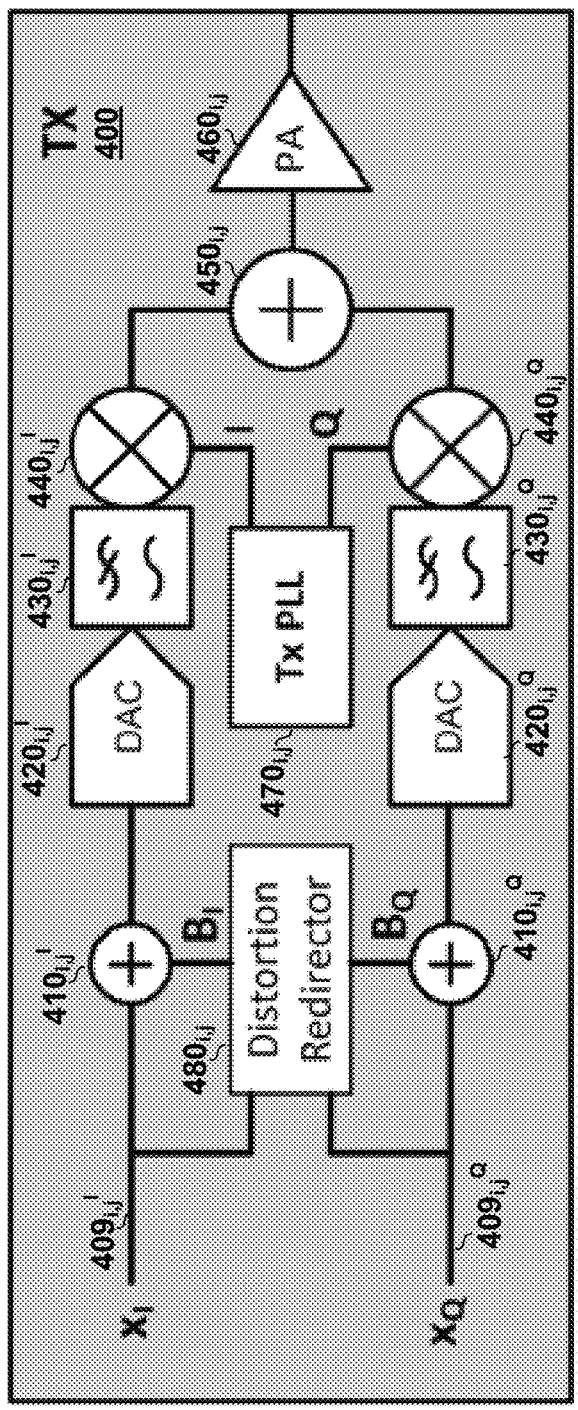
FIG. 4A illustrates an example transmitter of a phased array system configured to perform transmit distortion redirection.

FIG. 4A illustrates an example transmitter circuit 400 of a phased array system configured to perform transmit distortion redirection. The transmitter circuit 400 comprises circuitry for processing signals to be transmitted via a respective one of antenna elements 106. In this regard, the transmitter circuit 400 is configured to perform distortion redirection, as described above. In the example implementation of FIGS. 1A-1C, each of the circuit assemblies 111 may comprise four instances of transmitter circuit 400.

As shown in the example implementation illustrated in FIG. 4A, the transmitter circuit 400 is arranged for processing each of two digital inputs (shown as $X_I$ and $X_Q$ in FIG. 4) corresponding to the in-phase and quadrature components (I/Q components) of the input signals—that is, the signals being transmitted via the corresponding antenna element. The transmitter circuit 400 comprises a pair of adders $410_{i,j}^I$ and $410_{i,j}^Q$, a pair of digital-to-analog converters (DACs) $420_{i,j}^I$ and $420_{i,j}^Q$, a pair of filters $430_{i,j}^I$ and $430_{i,j}^Q$, a pair of mixers $440_{i,j}^I$ and $440_{i,j}^Q$, an adder $450_{i,j}$, and a power amplifier (PA) $460_{i,j}$. For example, the adder $410_{i,j}^I$, the DAC $420_{i,j}^I$, the filter $430_{i,j}^I$, and the mixer $440_{i,j}^I$ are configured for processing the in-phase component of the input signals (an I-component processing path); whereas the adder $410_{i,j}^Q$, the DAC $420_{i,j}^Q$, the filter $430_{i,j}^Q$, and the mixer $440_{i,j}^Q$ are be used in processing the quadrature components (Q component) of the input signals (an Q-component processing path). The outputs of the I-component processing path and the Q-component processing path (corresponding to outputs of the mixers $440_1$ and $440_2$) are added via adder $450_{i,j}$, and the result is then be amplified via the PA $460_{i,j}$.

The transmitter circuit 400 also comprises a transmit phase-locked loop (PLL) $470_{i,j}$ for providing shared timing (periodic) signals. The PLL $470_{i,j}$ generates different timing signals corresponding to the I/Q components, which are applied to the I-component processing path and the Q-component processing path via the mixers $440_{i,j}^I$ and $440_{i,j}^Q$.

Further, the transmitter circuit 400 comprises distortion redirector circuitry $480_{i,j}$ configured to determine distortion redirection adjustments and generate control signals for making these adjustments. For example, the distortion redirector $480_{i,j}$ receives copies of the input signal (e.g., the I-component and Q-component, shown as $X_I$ and $X_Q$) and computes based thereon corresponding adjustments to redirect distortion in an adaptive manner. The distortion redirector $480_{i,j}$ generates adjustment signal $B_{i,j}$ (and corresponding components $B_{i,j}^I$ and $B_{i,j}^Q$, configured for application to each of the I-component and Q-component, respectively) that need to be added to fundamental signals as described with respect to FIG. 3, above, to redirect distortion by rotating the anticipated distortion vector as a function of the corresponding antenna element (antenna index). The computed adjustments are applied to the I-component processing path and the Q-component processing path, via the adders $410_{i,j}^I$ and $410_{i,j}^Q$.

The approach exemplified in this implementation has the benefit of being robust with respect to the power amplifier distortion model and variations thereof. Further, it requires no feedback as it performs the computation based on the desired signals rather than the actual output of the PA $460_{i,j}$.

Figure 4B:
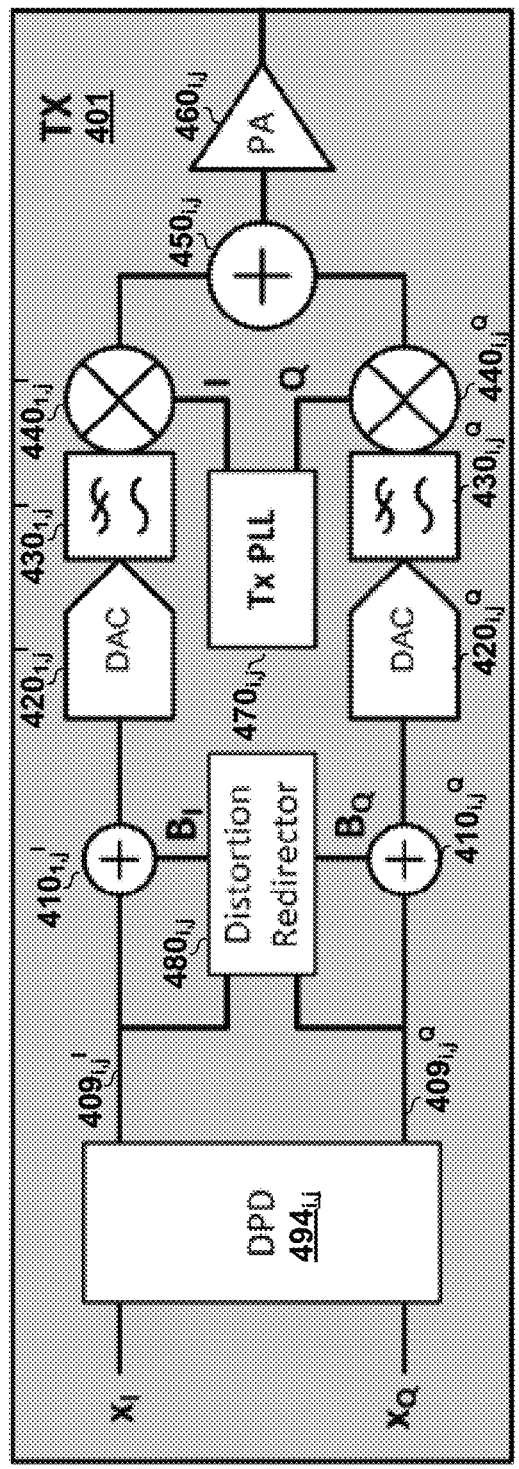
FIG. 4B illustrates another example transmitter of a phased array system configured to perform transmit distortion redirection.

FIG. 4B illustrates another example transmitter of a phased array system configured to perform transmit distortion redirection. Transmitter circuit 401 is substantially similar to the transmitter circuit 400. However, the transmitter circuit 401 additionally comprises a digital pre-distortion (DPD) circuit $494_{i,j}$ operable to perform digital pre-distortion in an open-loop manner. In this regard, pre-distortion, including digital pre-distortion (DPD), may be used in communication systems to mitigate and/or counteract distortion introduced during communications of signals, such as because of certain characteristics (e.g., nonlinearity) of certain components (e.g., power amplifiers, such as the PA $484_{i,j}$) used during communication-related operations. Use of DPD may further improve performance as power amplifiers are typically the last circuit and/or amplification step in a signal chain and have important effects on signal transmission and quality (e.g., introduce nonlinear distortion). Accordingly, in the transmitter circuit 401, DPD adjustments, as applied via the DPD circuit $494_{i,j}$ to the I/Q components (e.g., to signals $X_I$ and $X_Q$), are combined with the distortion redirection adjustments (as applied by the distortion redirector 490) to allow further enhancement of performance-particularly with respect to reduction of distortion.

Figure 5A:
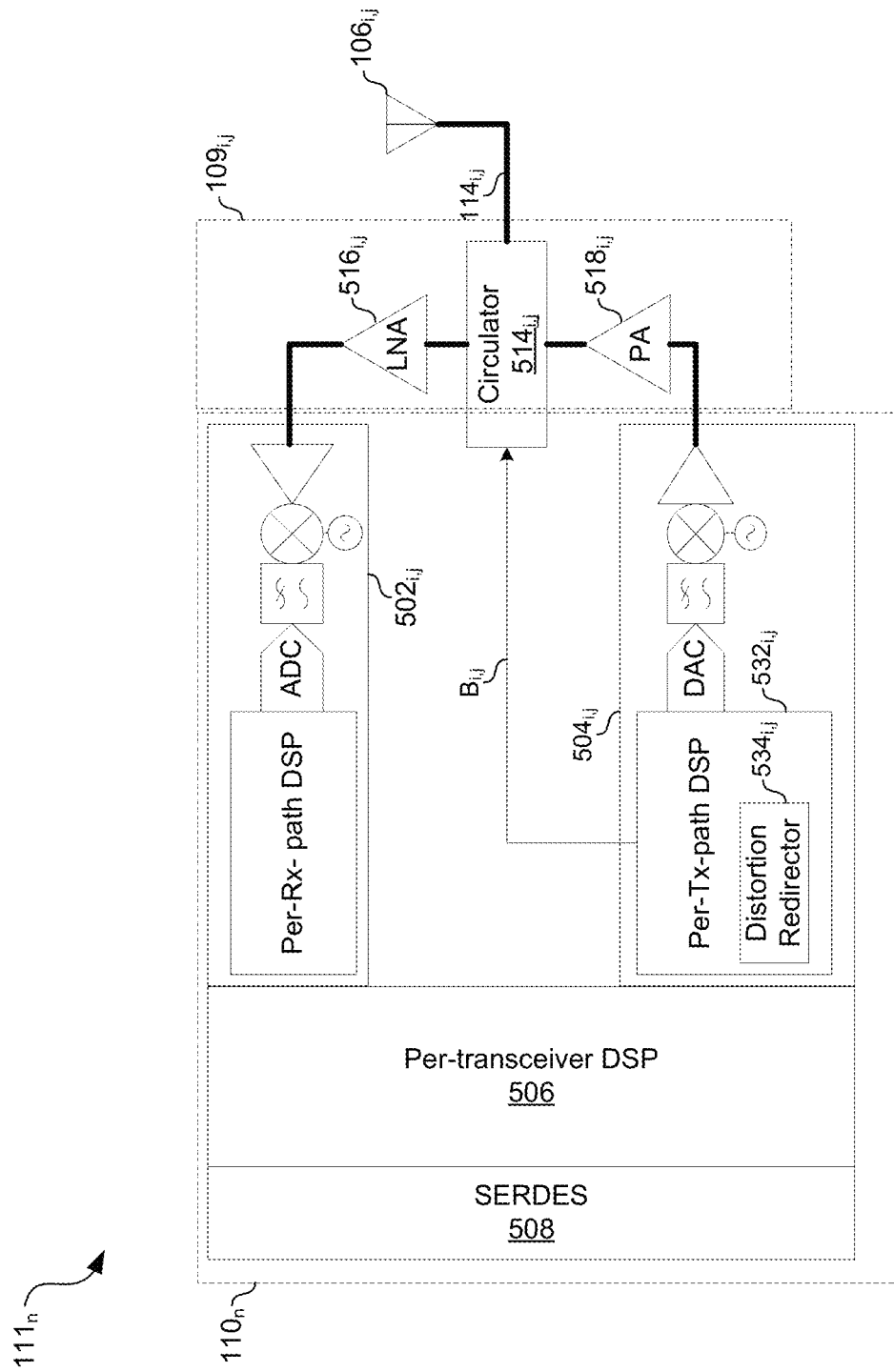
FIGS. 5A and 5B illustrate an example transceiver of a phased array system configured to perform transmit distortion redirection.
Figure 5B:
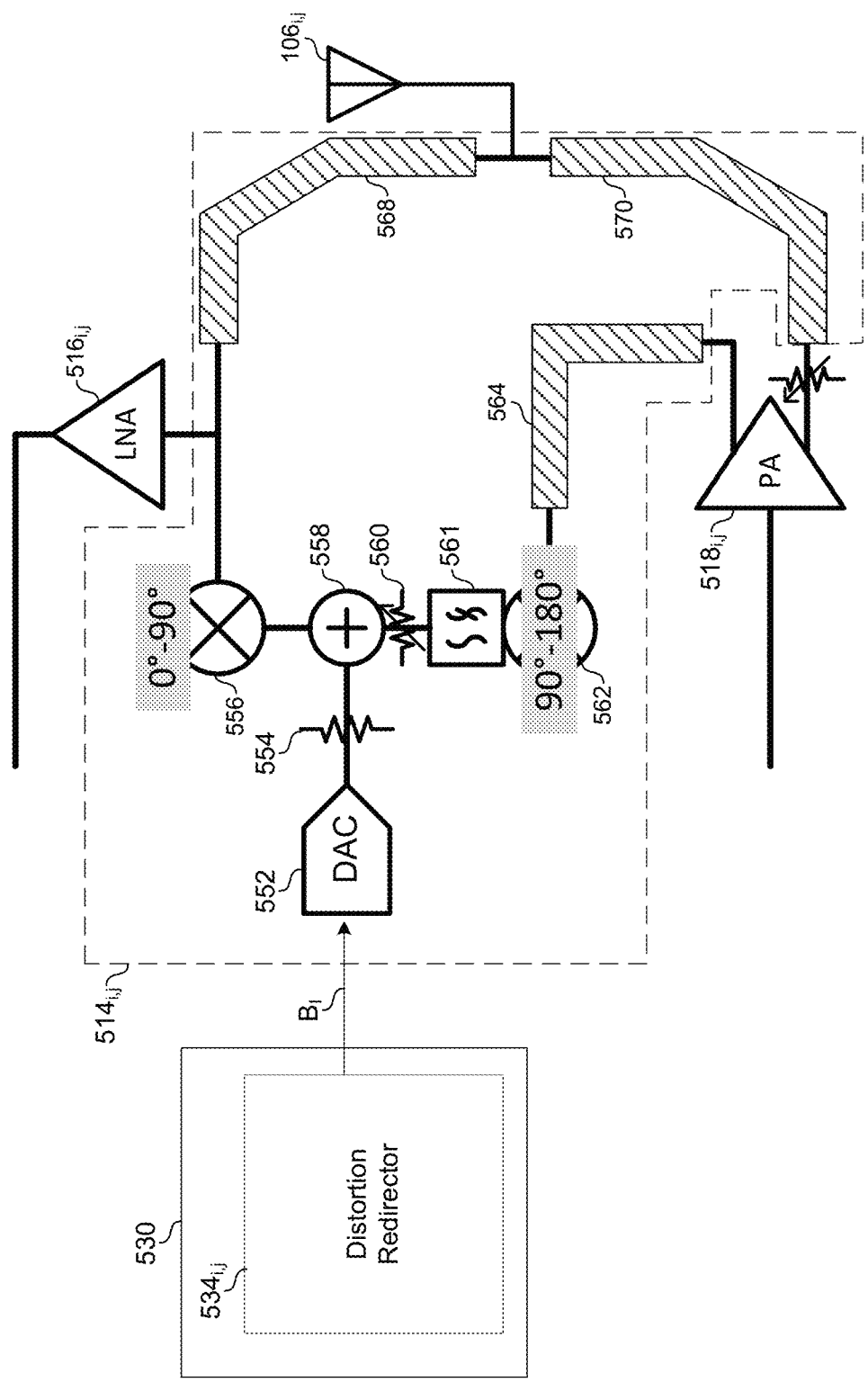

FIGS. 5A and 5B illustrate an example transceiver of a phased array system configured to perform transmit distortion redirection. Referring to FIG. 5A, shown is a circuit assembly $111_n$ comprising system-on-chip $110_n$, front-end circuit $109_{i,j}$, and antenna element $106_{i,j}$. In an example implementation, the SoC $110_n$ is a CMOS device and the LNA $516_{i,j}$ and PA $518_{i,j}$ are PHEMT devices. In other example implementations, one or more of the circuits 109, or portions thereof, may be integrated on the CMOS chip 110.

The example SoC $110_n$ comprises serialization and deserialization (SERDES) circuitry 508, per-transceiver digital signal processing (DSP) circuitry 506, one or more receive front-end circuits $502_{i,j}$, one or more transmit front-end circuits $504_{i,j}$, and a portion of one or more (four, in an example implementation) circulator $514_{i,j}$. Although only one receive front-end circuit $502_{i,j}$ and one transmit front-end circuit $504_{i,j}$ are shown for simplicity of illustration, the SoC $110_n$ may comprise any number of instances of these circuits. In the example implementations of FIG. 1B, for example, the SoC $110_n$ may comprise four instances of receive front-end circuit $502_{i,j}$—one for each of the four antenna elements $106_{i,j}$ via which the SoC $110_n$ receives, and four instances of transmit front-end circuit $504_{i,j}$—one for each of the four antenna elements $106_{i,j}$ via which the SoC $110_n$ transmits.

The example circuit $109_{i,j}$ comprises a low-noise amplifier $516_{i,j}$, a power amplifier $518_{i,j}$, and a portion of the circulator $514_{i,j}$. Although only one circuit $109_{i,j}$ is shown for simplicity of illustration, the circuit assembly $111_n$ may comprise any number of instances of this circuit. In the example implementations of FIG. 1B, for example, the circuit assembly $111_n$ may comprise four instances—one for each antenna $106_{i,j}$ via which the circuit assembly $111_n$ transmits and/or receives.

In the example implementation of FIG. 5A, each of the transmit front-end circuits $504_{i,j}$, comprises a distortion redirector circuit $534_{i,j}$. The distortion redirector circuit $534_{i,j}$ operates similarly to the distortion redirector circuits $480_{i,j}$ and $490_{i,j}$ described above. Instead of the phase adjustment signal $B_{i,j}$ (comprising I and Q components) being added to the DAC input signals, however, in FIG. 5B the signal $B_{i,j}$ is input to the circulator $514_{i,j}$. Thus, in FIG. 5B, the adjustment signal $B_{i,j}$, is added to the signal to be transmitted after the signal has passed through the PA $518_{i,j}$. This has the advantage of the signal $B_{i,j}$ not passing through the PA $518i,j$, and thus not generating additional distortion products.

Referring to FIG. 5B, details of an example implementation of the circulator $514_{i,j}$ are shown. The circulator comprises a digital to analog converter (DAC) 552, an attenuator 554, a combiner 558, mixers 556 and 562, filter 561, and quarter wavelength transmission lines 564, 568, and 570. The circulator operates such that, ideally, signals traveling clockwise from the output of PA $518_{i,j}$ to the input of the LNA $516i,j$ (through transmission line 564 and the mixers 562 and 556), add destructively (are 180° out of phase) with signals traveling clockwise from the output of the PA $518_{i,j}$ to the input of the LNA $516_{i,j}$ (through transmission lines 570 and 568). The circulator of FIG. 5B is just one example of a circulator. Aspects of this disclosure can be applied to any suitable circuit exhibiting nonreciprocal phase transfer.

In operation, the distortion redirector $534_{i,j}$ generates baseband adjustment signal $B_{i,j}$ (comprising I and Q components). The adjustment signal than then gets converted to analog by DAC 552. Depending on the swing of the output of DAC 552 and the level of the distortion products to be rotated, the output of the DAC 552 may be attenuated by attenuator 554. The (possibly attenuated) output of the DAC 552 is input to combiner 558 where it is combined with the output of the PA $518_{i,j}$ which has propagated clockwise through transmission line 564 and been downconverted by mixer 562. The resulting signal is then upconverted by mixer 556 and propagates through transmission line 568 before adding coherently, at the antenna element $106_{i,j}$, with the output of the PA $518_{i,j}$ which has propagated counter-clockwise through transmission line 570. In the resulting signal at the antenna element $106_{i,j}$, the phase of the distortion is rotated relative to the phase of the fundamental as described above (e.g., with reference to FIGS. 2 and 3). That is, assuming it is desired to beamform the fundamental to a direction D1, and such beamforming requires the fundamental to have phase α at antenna $106_{i,j}$, then the distortion products have been rotated to some different angle β at antenna $106_{i,j}$. In this manner, the distortion products from multiple of the antenna elements 106 do not coherently combine in the direction D1 (they may instead coherently combine in one or more different direction(s) D2, or may not coherently combine in any particular direction).

Figure 6:
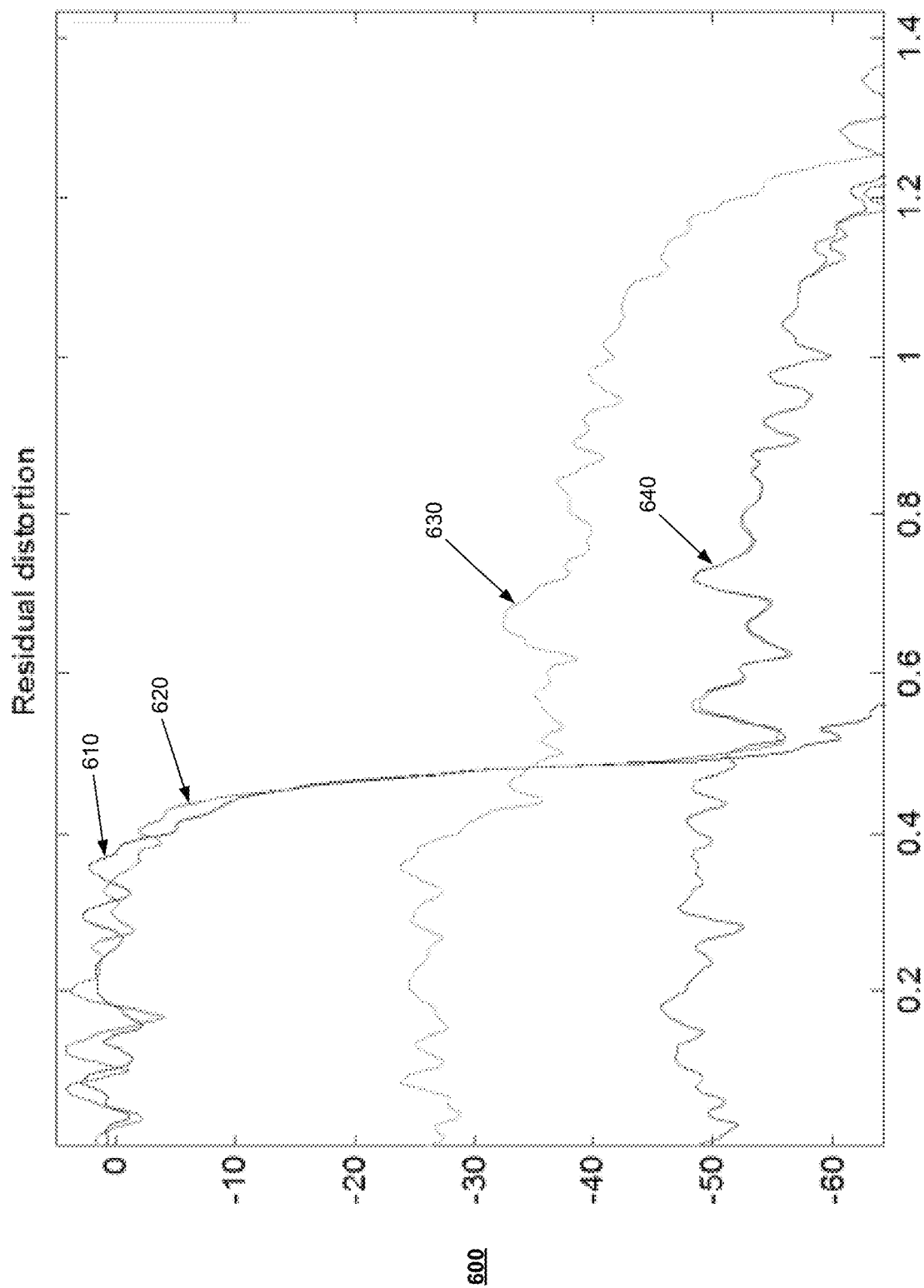
FIG. 6 illustrates a simulation of an example use scenario of a phased array system using transmit distortion redirection.

FIG. 6 illustrates a simulation of an example use scenario of a phased array system using transmit distortion redirection. Shown in FIG. 6 is a power spectral density (PSD) chart 600 corresponding to an example use scenario of a phased array that incorporates use of distortion redirection, as described above for example.

In chart 600, the y-axis represents the antenna power (in dBm) and the x-axis represents the frequency (in multiples of the baseband signal). Shown in chart 600 are graphs 610, 620, 630, and 640, corresponding respectively to the baseband signal, the main signal (beam) of the phased array, the per-element distortion, and phased array overall distortion. As illustrated in chart 600, use of the distortion redirection results in substantial decrease in overall phased array overall distortion.

Figure 7:
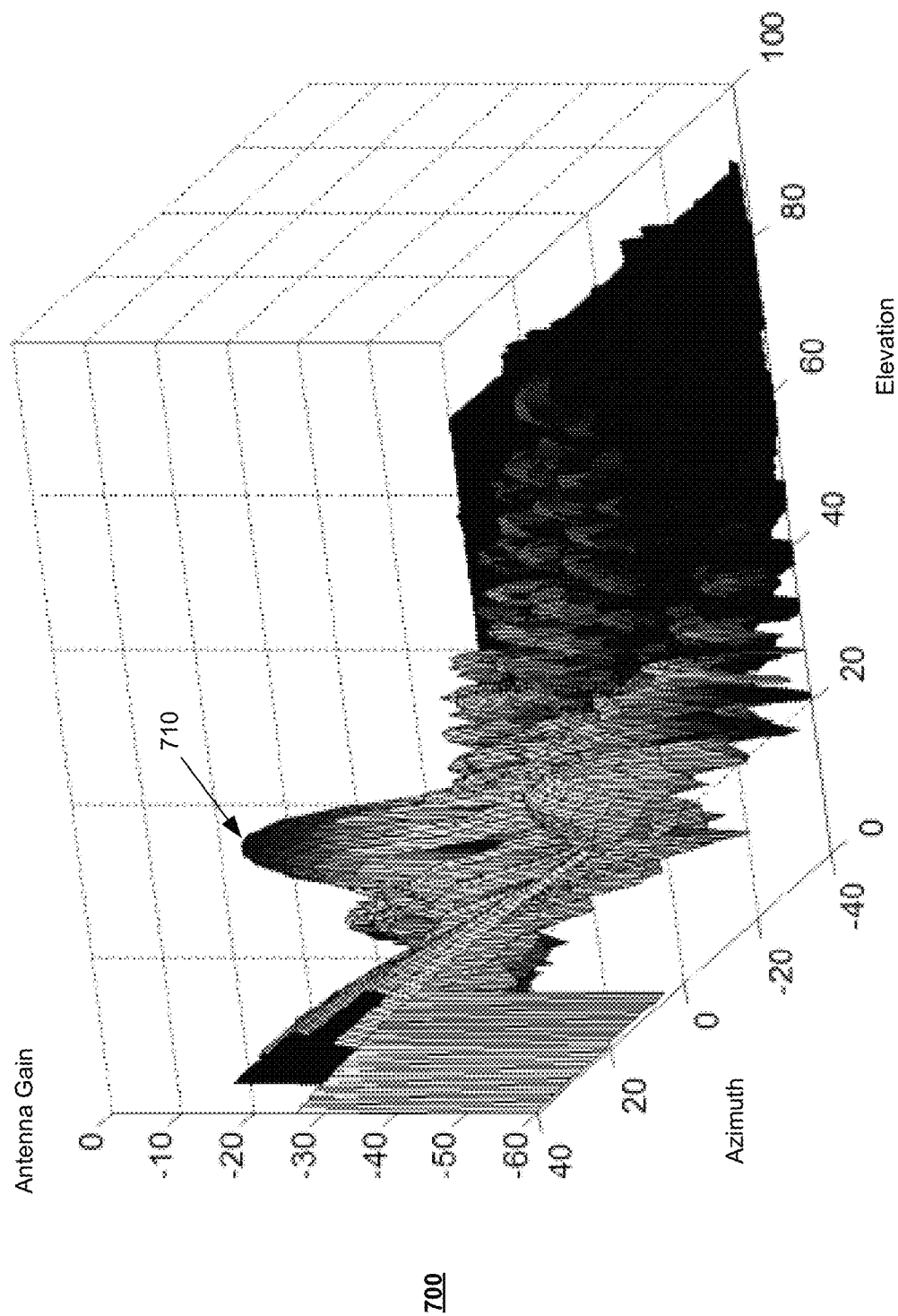
FIG. 7 illustrates an example radiation pattern for a phased array configured to perform transmit distortion redirection.

FIG. 7 illustrates an example radiation pattern for a phased array configured to perform transmit distortion redirection. in accordance with an example implementation of this disclosure. In chart 700, the z-axis represents antenna gain, and the x-axis and y-axis correspond to elevation and azimuth (both relative to the main direction of the antenna—i.e., with 0 representing the boresight—that is, the direction of the main beam of the antenna), respectively. As shown in chart 700, use of distortion redirection allows redirecting distortion away from the boresight. For example, with desired signal on the boresight direction, distortion 710 may be directed away from the boresight—e.g., redirected ~20 degrees off boresight as shown in the particular example simulation illustrated in FIG. 7.

Figure 8:
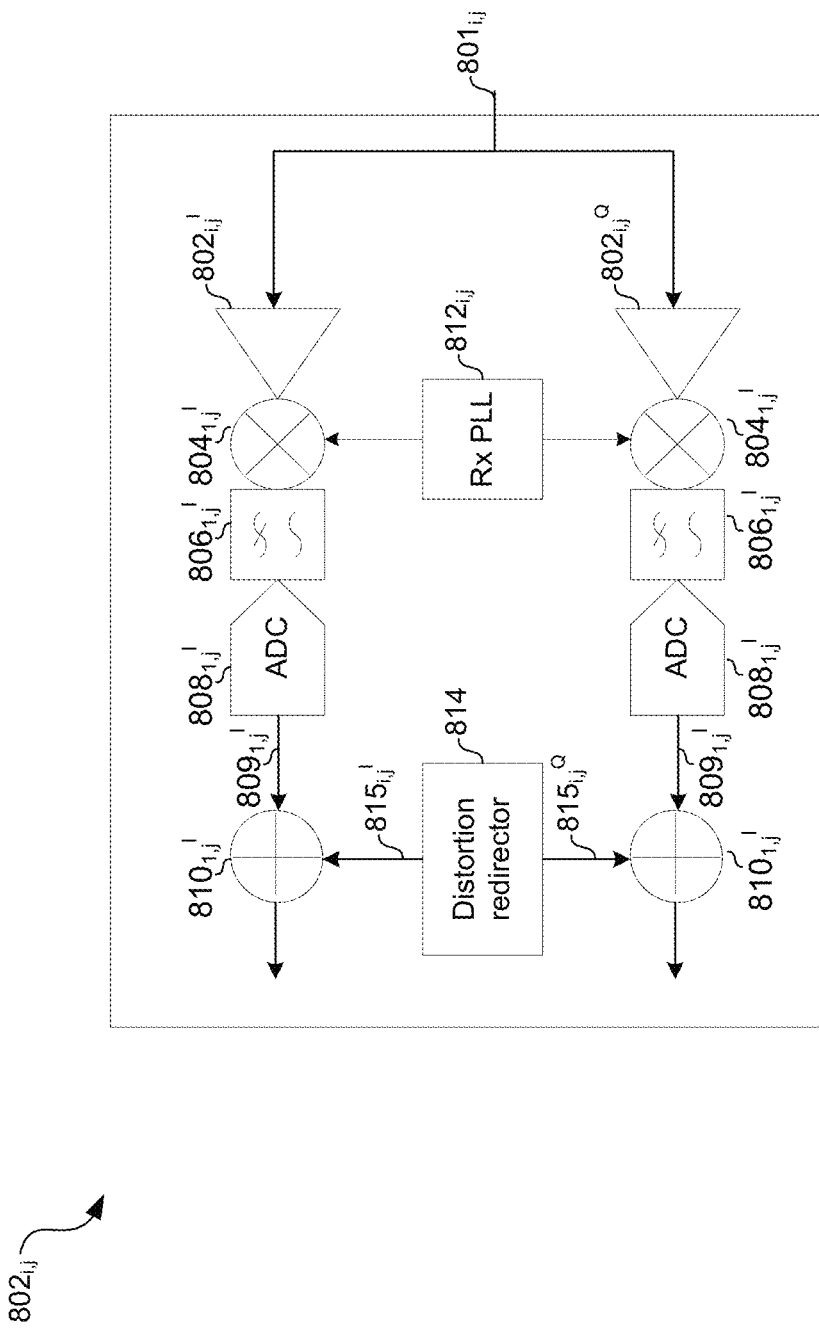
FIG. 8 illustrates an example implementation of a receive circuit of a phased array system configured to perform received distortion redirection.

FIG. 8 illustrates an example implementation of a receiver circuit of a phased array system configured to perform received distortion redirection. The receive front-end $802_{i,j}$ is configured to receive a signal $801_{i,j}$ from antenna $106_{i,j}$ (e.g., via a circulator and an LNA). The received signal is downconverted to quadrature phase components I and Q by mixers $804_{i,j}{}^I$ and $804_{i,j}{}^Q$ driven by local oscillator signals from RX PLL $812_{i,j}$. The mixer outputs are then filtered by filters $806_{i,j}{}^I$, and $806_{i,j}{}^Q$ and digitized by ADCs $808_{i,j}{}^I$ and $808_{i,j}{}^Q$ to generate baseband received signals $809_{i,j}{}^I$ and $809_{i,j}{}^Q$. Distortion rotation signals $815_{i,j}{}^I$ and $815_{i,j}{}^Q$ are then combined with the received baseband signals $809_{i,j}{}^I$ and $809_{i,j}{}^Q$ resulting in signals $811_{i,j}{}^I$ and $811_{i,j}{}^Q$, with the result that distortion products in signals $811_{i,j}{}^I$ and $811_{i,j}{}^{jQ}$ are rotated relative to distortion products in signals $809_{i,j}{}^I$ and $809_{i,j}{}^Q$, whereas the fundamental in signals $811_{i,j}{}^I$ and $811_{i,j}{}^{jQ}$ is not rotated with respect to the fundamental in signals $809_{i,j}{}^I$ and $809_{i,j}{}^Q$ (or is rotated by a different amount than the distortion products).

The distortion rotating signals $815_{i,j}{}^I$ and $815_{i,j}{}^Q$ may be generated based on known (either by design and/or by measurement/calibration) characteristics of a transmitter (e.g., using a model of the transmitter's power amplifier) from which the signal $801_{i,j}$ was received.

Figure 9:
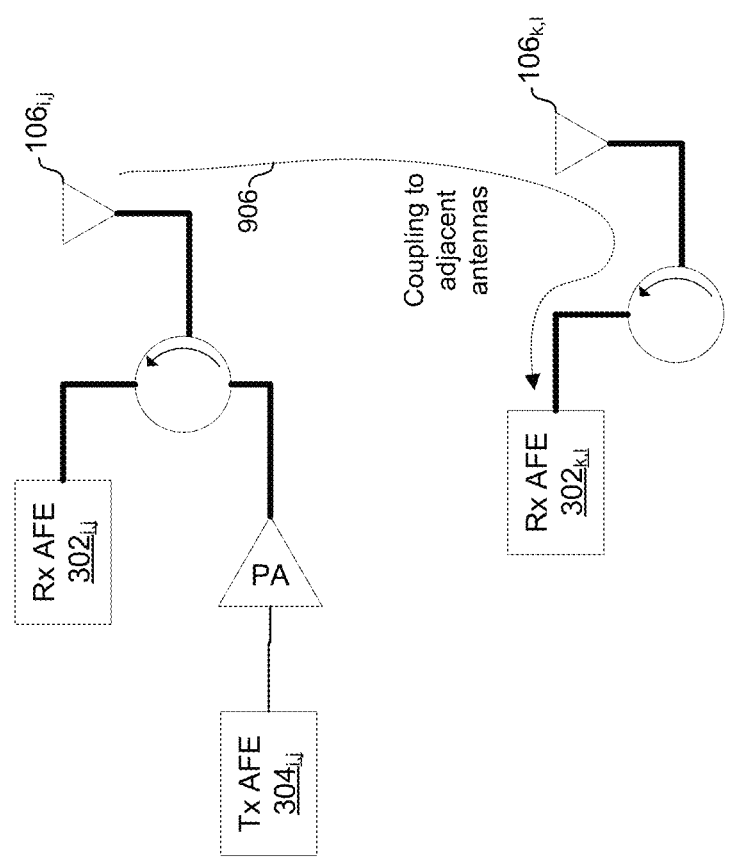
FIG. 9 illustrates a technique for calibrating distortion redirection in a phased array system.

FIG. 9 illustrates a technique for calibrating distortion redirection in a phased array system. Because of the close proximity of antennas in a phased array system 100, there will typically be some coupling between antennas. For example, as illustrated by arrow 906 in FIG. 9, transmissions from antenna element $106_{i,j}$ may couple to antenna element $106_{k,l}$ and thus some of the signal transmitted via $106_{i,j}$ will be present at receive front-end $302_{k,l}$. While this coupling is typically an undesirable effect, it can also be taken advantage of to calibrate the distortion redirector circuitry. For example, during a calibration period, Tx AFE $304_{i,j}$ may transmit a signal with distortion redirection disabled. The transmitted signal is then received at Rx front-end $302_{k,l}$ due to coupling of the antennas and Rx front-end $302_{k,l}$ can measure the distortion products present in the signal and convey this information back to Tx front-end $304_{i,j}$ via the data bus 202. The Tx front-end $304_{i,j}$ can then use this information to configure its distortion redirector circuitry $480_{i,j}$.

Similarly, in an example implementation, instead of relying on mutual coupling between antenna elements 106, the circulator $514_{i,j}$ may be configurable (e.g., by controlling phase and amplitude coefficients applied to mixers 556 and 662 of circulator $514_{i,j}$) into a calibration state in which the output of PA $308_{i,j}$ is conveyed to the input of the Rx AFE $302_{i,j}$. The Rx AFE $302_{i,j}$ can then measure the distortion products and convey this information to Tx AFE $304_{i,j}$.

In accordance with an example implementation of this disclosure, a system comprises a plurality of antenna elements (e.g., $106_{1,1}$-$106_{8,8}$) arranged in a two-dimensional array, and a plurality of transmitter circuits (e.g., $400_{1,1}$-$400_{8,8}$) communicatively coupled to the antenna elements, wherein the antenna elements and transmitter circuits are configured such that desired components of signals output by the plurality of transmitter circuits and radiated via the antenna elements coherently combine in a desired direction (e.g., boresight in FIG. 7). Each of the transmitter circuits is operable to modify a respective input signal (e.g., $409_{i,j}{}^{I}$, and $408_{i,j}{}^{Q}$) to generate a corresponding modified signal for transmission via a respective one of the antenna elements. Each of the transmitter circuits comprises a distortion redirection circuit (e.g., $480_{i,j}$) operable to generate a transmit redirection vector (e.g., B). The modification of the first signal comprises combining the first signal with the transmit redirection vector (e.g., in $410_{i,j}{}^{I}$ and $410_{i,j}{}^{Q}$). The combining of the transmit redirection vector with the first signal shifts a phase of undesired components in the second signal relative to a phase of desired components in the second signal such that the undesired components in the second signal do not coherently combine in the desired direction (e.g., the combine in direction 710 of FIG. 7). The transmit redirection vector may be combined with the first signal prior to digital to analog conversion of the first signal (e.g., in $450_{i,j}$ prior to digital to analog conversion by $460_{i,j}$). Each of the transmitter circuits may comprise a power amplifier, and the transmit redirection vector may be combined with the first signal at an output of the power amplifier (e.g., in circulator $514_{i,j}$). Each of the transmitter circuits may comprise a circulator (e.g., $514_{i,j}$), and the combination of the transmit redirection vector with the first signal may occur in the circulator. In each one of the transmitter circuits, characteristics (e.g., amplitude, frequency, and/or phase) of the transmit redirection vector may be determined based on the location in the two-dimensional array of one of the antenna elements that receives the modified signal of the one of the transmitter circuits (e.g., the location may correspond to its indices i and j in the example of FIG. 1A). Characteristics of the transmit redirection vector may be determined such that the undesired components in the second signal coherently combine in a direction other than the desired direction. The characteristics of the transmit redirection vector may be varied over time (e.g., per symbol of the input signal) such that the undesired components in the second signal are dispersed over a range of angles over time. The characteristics of the transmit redirection vector may be determined such that the undesired components in the second signal do destructively combine in the desired direction. The system may comprise a plurality of receiver circuits (e.g., $802_{i,j}$) communicatively coupled to the antenna elements. Each of the receiver circuits may be operable to modify a respective received signal (e.g., $809_{i,j}$) from a respective one of the antenna elements to generate a corresponding output signal. Each of the receiver circuits may comprises a distortion redirection circuit (e.g., 814) operable to generate a receive redirection vector (e.g., $815_{i,j}$). The modification of the received signal may comprise combining the received signal with the receive redirection vector (e.g., in $810_{i,j}{}^{I}$ and $810_{i,j}{}^{Q}$), where the combining of the receive redirection vector with the received signal shifts a phase of undesired components in the output signal relative to a phase of desired components in the output signal such that the undesired components in the output signal do not coherently combine in the desired direction. The receive redirection vector may be combined with the received signal after analog to digital conversion of the received signal. In each one of the receiver circuits, characteristics (e.g., phase, frequency, and/or amplitude) of the receive redirection vector are determined based on the location in the two-dimensional array of one of the antenna elements from which the received signal was received. The characteristics of the receive redirection vector may be determined such that the undesired components in the received signal coherently combine in a direction other than the desired direction. The characteristics of the receive redirection vector may be varied over time (e.g., per symbol of the received signal) such that the undesired components in the received signal are dispersed over a range of angles over time. The characteristics of the receive redirection vector may be determined such that the undesired components in the received signal destructively combine in the desired direction. 16. The system of claim 1, wherein the plurality of antenna elements is formed in a single plastic substrate having a conductive material on its surface. The plurality of transmitter circuits may reside in a circuit assembly (e.g., $111_n$) mounted to the plastic substrate. A first portion of the plurality of transmitter circuits (e.g., $400_{1,1}$-$400_{2,2}$) may reside in a first circuit assembly (e.g., $111_1$) and a second portion of the plurality of transmitter circuits (e.g., $400_{3,3}$-$400_{4,4}$) may reside in a second circuit assembly (e.g., $111_2$). The first circuit assembly and the second circuit assembly may be communicatively coupled via a data bus (e.g., 202) and may comprise serial/deserialization circuits (e.g., 508) for communicating over the data bus.

As used herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As used herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As used herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As used herein, the term "exemplary" means serving as a non-limiting example, instance, or illustration. As used herein, the terms "for example" and "e.g." set off lists of one or more non-limiting examples, instances, or illustrations.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system, comprising:
a plurality of antenna elements arranged in a two-dimensional array; and
a plurality of transmitter circuits communicatively coupled to the antenna elements, wherein:
the antenna elements and transmitter circuits are configured such that desired components of signals output by the plurality of transmitter circuits and radiated via the antenna elements coherently combine in a desired direction;
each of the transmitter circuits is operable to modify a respective first signal to generate a corresponding second signal for transmission via a respective one of the antenna elements;
each of the transmitter circuits comprises a distortion redirection circuit operable to generate a transmit redirection vector; and
the modification of the first signal comprises combining, in a circulator, the first signal with the transmit redirection vector;
the combining of the transmit redirection vector with the first signal shifts a phase of undesired components in the second signal relative to a phase of desired components in the second signal such that the undesired components in the second signal destructively combine in the desired direction, wherein destructively combining signals includes adding signals that are 180 degrees out of phase.

2. The system of claim 1, wherein the transmit redirection vector is combined with the first signal prior to digital to analog conversion of the first signal.

3. The system of claim 2, wherein:
each of the transmitter circuits comprises a power amplifier; and
the transmit redirection vector is combined with the first signal at an output of the power amplifier.

4. The system of claim 2, wherein each of the transmitter circuits comprises a circulator.

5. The system of claim 1, wherein, in each one of the transmitter circuits, characteristics of the transmit redirection vector are determined based on location in the two-dimensional array of one of the antenna elements that receives the first signal of the one of the transmitter circuits.

6. The system of claim 5, wherein one or more characteristics of the transmit redirection vector are such that the undesired components in the second signal coherently combine in a direction other than the desired direction.

7. The system of claim 6, wherein the one or more characteristics of the transmit redirection vector are varied over time such that the undesired components in the second signal are dispersed over a range of angles over time.

8. The system of claim 7, wherein the one or more characteristics of the transmit redirection vector are varied per symbol of the first signal.

9. The system of claim 5, wherein the one or more characteristics of the transmit redirection vector are determined such that the undesired components in the second signal destructively combine in the desired direction.

10. The system of claim 1, comprising a plurality of receiver circuits communicatively coupled to the antenna elements, wherein:
each of the receiver circuits is operable to modify a respective received signal from a respective one of the antenna elements to generate a corresponding output signal;
each of the receiver circuits comprises a distortion redirection circuit operable to generate a receive redirection vector; and
the modification of the received signal comprises combining the received signal with the receive redirection vector;
the combining of the receive redirection vector with the received signal shifts a phase of undesired components in the output signal relative to a phase of desired components in the output signal such that the undesired components in the output signal do not coherently combine in the desired direction.

11. The system of claim 10, wherein the receive redirection vector is combined with the received signal after analog to digital conversion of the received signal.

12. The system of claim 10, wherein, in each one of the transmitter circuits, characteristics of the receive redirection vector are determined based on location in the two-dimensional array of one of the antenna elements that receives the first signal of the one of the transmitter circuits.

13. The system of claim 10, wherein one or more characteristics of the receive redirection vector are such that the undesired components in the second signal coherently combine in a direction other than the desired direction.

14. The system of claim 10, wherein the one or more characteristics of the receive redirection vector are varied over time such that the undesired components in the second signal are dispersed over a range of angles over time.

15. The system of claim 14, wherein the one or more characteristics of the receive redirection vector are varied per symbol of the first signal.

16. The system of claim 15, wherein the one or more characteristics of the receive redirection vector are determined such that the undesired components in the second signal destructively combine in the desired direction.

17. The system of claim 10, wherein the plurality of antenna elements is formed in a single plastic substrate having a conductive material on its surface.

18. The system of claim 17, wherein the plurality of transmitter circuits reside in a circuit assembly mounted to the plastic substrate.

19. The system of claim 10, wherein:
a first portion of the plurality of transmitter circuits reside in a first circuit assembly and a second portion of the plurality of transmitter circuits reside in a second circuit assembly; and
the first circuit assembly and the second circuit assembly are communicatively coupled via a data bus.

20. The system of claim 19, wherein each of the first circuit assembly and the second circuit assembly comprises a serial/deserialization circuit for communicating over the data bus.

* * * * *